United States Patent [19]
Lindholm

[11] Patent Number: 5,794,049
[45] Date of Patent: Aug. 11, 1998

[54] COMPUTER SYSTEM AND METHOD FOR EXECUTING ARCHITECTURE SPECIFIC CODE WITH REDUCED RUN-TIME MEMORY SPACE REQUIREMENTS

[75] Inventor: Timothy G. Lindholm, Palo Alto, Calif.

[73] Assignee: Sun Microsystems, Inc., Palo Alto, Calif.

[21] Appl. No.: 658,500

[22] Filed: Jun. 5, 1996

[51] Int. Cl.[6] ............................. G06F 9/312; G06F 9/40
[52] U.S. Cl. ..................... 395/706; 395/704; 395/709; 364/280.4; 364/280.5; 364/245.2; 364/246.11
[58] Field of Search ..................... 364/280.4, 280.2, 364/280.5, 245.2, 246.11, 246.3, 281.1, 245.9, 246.1, 247.3, 254.3, 254.5, 256.6, 281.7, 281.8; 395/707–709, 183.14, 685, 704, 706; 711/170, 115

[56] References Cited

U.S. PATENT DOCUMENTS

| | | | |
|---|---|---|---|
| 5,359,713 | 10/1994 | Moran et al. | 395/872 |
| 5,375,242 | 12/1994 | Kumar et al. | 395/707 |
| 5,504,901 | 4/1996 | Peterson | 395/708 |
| 5,577,230 | 11/1996 | Argade et al. | 711/150 |
| 5,590,331 | 12/1996 | Lewis et al. | 395/708 |
| 5,600,823 | 2/1997 | Sherer et al. | 395/500 |
| 5,604,905 | 2/1997 | Tevanian et al. | 395/706 |
| 5,692,047 | 11/1997 | McManis | 395/704 |
| 5,699,539 | 12/1997 | Garber et al. | 395/402 |
| 5,701,476 | 12/1997 | Fenger | 395/652 |

OTHER PUBLICATIONS

Hwu, et al. "Checkpoint repair for high–performance out–of–order execution machines", IEEE Trans. on Computers, vol. C–36, No. 12, pp. 1496–1514, Dec. 1987.

Tucker, Jr. "Section 9.3–Run–time storage management" from The Computer Science and Engineering Handbook, pp. 522–528, 1997.

Muchnick, et al. "F–code and its implementation: a portable software platform for data parallelism", The Computer Journal, vol. 29, No. 8, pp. 712–722, 1993.

Sohi. "Instruction issue logic for high–performance, interruptible, multiple function unit, pipelined computers", IEEE Trans. on Computers, vol. 39, No. 3, pp. 349–359, Mar. 1990.

Jouppi, et al. "Available instruction–level parallelism for superscalar and superpipelined machines", ACM, vol. 4, pp. 272–282, 1989.

Padua, et al. "Advanced compiler optimizations for supercomputers", Communications of the ACM, vol. 29, No. 12, pp. 1184–1201, Dec. 1986.

*Primary Examiner*—Emanuel Todd Voeltz
*Assistant Examiner*—Cuong H. Nguyen
*Attorney, Agent, or Firm*—Stephen M. Knauer; Flehr Hohbach Test Albritton & Herbert LLP

[57] ABSTRACT

A client computer system and associated method in a computer network over which is provided programs with methods in architecture neutral code. The client computer is capable of executing the programs with reduced run-time memory space requirements when the methods are in architecture specific code generated from the architecture neutral code of the methods. Specifically, a network communications interface receives the methods in architecture neutral code. A network communications manager loads uncompressed in available space in the run-time memory the architecture neutral code of the methods when received. A code generator then generates in the run-time memory uncompressed architecture specific code of the methods from the loaded architecture neutral code of the methods. An execution controller controls execution of the programs so that the methods are invoked and not invoked at different times. A code compressor compresses in the run-time memory the uncompressed architecture specific code of compressible ones of the methods that are not invoked so that space is made available in the run-time memory. The code compressor also decompresses in available space in the run-time memory the compressed architecture specific code of decompressible ones of the methods so that the decompressible ones of the methods may be invoked.

27 Claims, 6 Drawing Sheets

COMPUTER SYSTEM AND METHOD FOR EXECUTING ARCHITECTURE SPECIFIC CODE WITH REDUCED RUN-TIME MEMORY SPACE REQUIREMENTS

The present invention relates to computer systems and methods for executing programs with reduced run-time memory space requirements. In particular, the present invention pertains to computer systems and methods in a network for executing architecture specific code generated from architecture neutral code transmitted over the network so that the run-time memory space requirements of the architecture specific code is reduced.

BACKGROUND OF THE INVENTION

Computer systems are now being built or configured to take advantage of properties of programs whose code is in an architecture neutral (AN) binary format, hereinafter referred to as AN code. Thus, the AN code of these programs is independent of the specific architecture or platform of the computer system.

The term architecture is defined for the purposes of this document to mean the operating characteristics of a family of computer models. Examples of specific architectures include Macintosh computers, IBM PC compatible computers using the DOS or Windows operating systems, Sun Microsystems computers running the Solaris operating system, and computer systems using the Unix operating system.

The term architecture specific (AS) is defined for the purposes of this document to refer to the requirement that the code of certain programs be in a binary format, hereinafter referred to as AS code, for execution only on computer systems with a specific computer architecture. Thus, programs with code written in a conventional programming language (e.g., C language) and compiled for a specific architecture (e.g., IBM compatible PC) can only run on that architecture or emulators of that architecture.

The term architecture neutral (AN) is defined for the purposes of this document to refer to programs whose compiled code can be executed on a variety of computer systems with different architectures. For example, a computer system with a specific architecture can be configured with a Java (a trademark of Sun Microsystems) virtual machine module. The Java virtual machine module enables execution of programs with code written in the Java programming language and compiled into bytecode, hereinafter referred to as Java bytecode, for the instruction set of the Java virtual machine. Java bytecode is independent of the specific architecture of the computer system.

Important features of programs with AN code include their portability. For example, since programs in AN code can be executed on any computer system configured to execute the AN code regardless of the computer system's specific architecture, these programs can be easily transported over a network from one computer system to another. For example, programs compiled into Java bytecode can be executed on any computer system with a Java virtual machine module and can be easily transported over a network from one computer system to another using a HotJava (a trademark of Sun Microsystems) network communications manager.

Furthermore, another important feature related to the portability of programs compiled into Java bytecode is the verifiability of such programs. Specifically, the Java virtual machine module can easily verify that these programs satisfy predefined integrity criteria. Such integrity criteria include stack and data type usage restrictions that ensure that Java bytecode cannot overflow or underflow the Java virtual machine module's stack and that all instructions in Java bytecode utilize only data whose data type matches the data type restrictions for those instructions. As a result, a program in Java bytecode cannot forge object pointers and generally cannot access system resources other than those which the user has explicitly granted it permission to use.

For these reasons, computer systems are being configured for execution of programs in AN code that are received over a network. In fact, in some cases, such computer systems may not even require a secondary memory (e.g., a hard disk) since the programs are loaded directly into the run-time (i.e., execution-time) memory (e.g., random access memory (RAM)) of the computer system. As a result, the user of such a computer system is freed from the cycle of software purchase, installation, configuration and upgrade that is currently typical of software products.

The just described features of AN code make it particularly attractive for use with small or cheap computer systems that are networked and are loaded with AN code on demand. For example, these kinds of computer systems may be video games, personal digital assistants (PDAs), cellular phones, or other similar computer systems or computer operated devices.

Unfortunately, however, programs in AN code run slower than the same programs in AS code. For example, programs in Java code executed by a Java virtual machine module typically run 2.5 to 20 times as slow as the equivalent program in AS code. Thus, a user of a computer system may find it desirable to generate (i.e., translate) the AN code of a program received over a network into AS code for execution on the computer system. In this case, the computer system may also include a code generator that, upon receipt of the AN code of a program, generates it into corresponding AS code for execution on the specific architecture of the computer system.

In the just described computer systems, price is extremely important. In practice, one of the most significant costs in building such computer systems is the amount of run-time memory that is required for execution of loaded programs. It is therefore very important to reduce the amount of run-time memory required by these computer systems since such a reduction produces a strong competitive advantage.

Unfortunately, AS code which has been generated from AN is much larger than the original AN code. For example, AS code generated from Java bytecode is typically 2 to 5 times the size of the Java bytecode. Thus, a fixed amount of run-time memory can hold substantially less compiled AS code than AN code. However, as mentioned previously, AS code is much faster than AN code from which it is generated and may be the only way to achieve adequate performance.

Furthermore, in the computer systems of the type described above, it may not be possible to page to secondary memory. In this case the generated AS code could be cached in the run-time memory and flushed when its space in the run-time memory is required. However, when execution of the flushed program is to be continued, the original AN code must again be downloaded over the network and generated into the AS code. This significantly affects the execution speed of the program. Furthermore, even in computer systems where it is possible to page to secondary memory, the time required to retrieve the AS code from the secondary memory may be too costly.

In the present invention, compression and then decompression of the AS code is used to reduce the storage cost of the AS code in the run-time memory. Since this is much faster than flushing AS code and regenerating it, the execution speed of the AS code is not significantly affected by compression and decompression.

SUMMARY OF THE INVENTION

In summary, the present invention is a client computer system and associated method in a computer network over which are provided programs with methods in architecture neutral code. The client computer is capable of executing programs with reduced run-time memory space requirements when the methods are in architecture specific code generated from the architecture neutral code of the methods. The client computer system comprises a run-time memory, a communications interface, a network communications manager, an execution controller, a code generator, and a code compressor.

The network communications interface receives the methods in architecture neutral code. The network communications manager loads uncompressed the architecture neutral code of the methods when received into available space in the run-time memory.

The code generator then generates in the run-time memory uncompressed architecture specific code of the methods from the loaded architecture neutral code of the methods. The execution controller controls execution of the programs so that the methods are invoked and not invoked at different times.

The code compressor compresses in the memory the architecture specific code of compressible ones of the methods that are not invoked. As a result, space is made available in the run-time memory. The code compressor also decompresses into available space in the run-time memory the architecture specific code of decompressible ones of the methods so that the decompressible ones of the methods may be invoked.

In one embodiment, the code compressor decompresses the compressed architecture specific code of the decompressible ones of the methods as soon as the decompressible ones of the methods are to be invoked.

In another embodiment, the code compressor decompresses the compressed architecture specific code of the decompressible ones of the methods after a predetermined time interval.

In still another embodiment, the code compressor compresses the uncompressed architecture specific code of the compressible ones of the methods as soon as the compressible ones of the methods are no longer invoked.

In yet another embodiment, the code compressor compresses the uncompressed architecture specific code of the compressible ones of the methods when space in the run-time memory is needed but not available. Moreover, in this embodiment, the client computer system may further comprise a least recently invoked list that lists those of the methods that are currently not invoked in order of least recently invoked method to most recently invoked method. As a result, the compressible ones of the methods are the least recently invoked methods in the least recently invoked list with uncompressed architecture specific code when space in the run-time memory is needed but not available.

In yet still another embodiment, the code compressor flushes from the run-time memory the compressed architecture specific code of flushable ones of the methods when space in the run-time memory is needed but not available.

As an alternative to the previous embodiment, the client computer system may further comprise a secondary memory. In this case, the code compressor stores in the secondary memory the compressed architecture specific code of storable ones of the methods when space in the run-time memory is needed but not available. The code compressor retrieves from the secondary memory the compressed architecture specific code of retrievable ones of the methods whose compressed architecture specific code is to be decompressed.

BRIEF DESCRIPTION OF THE DRAWINGS

Additional goals and features of the invention will be more readily apparent from the following detailed description and appended claims when taken in conjunction with the drawings, in which:

DETAILED DESCRIPTION OF THE INVENTION

Figure 1:
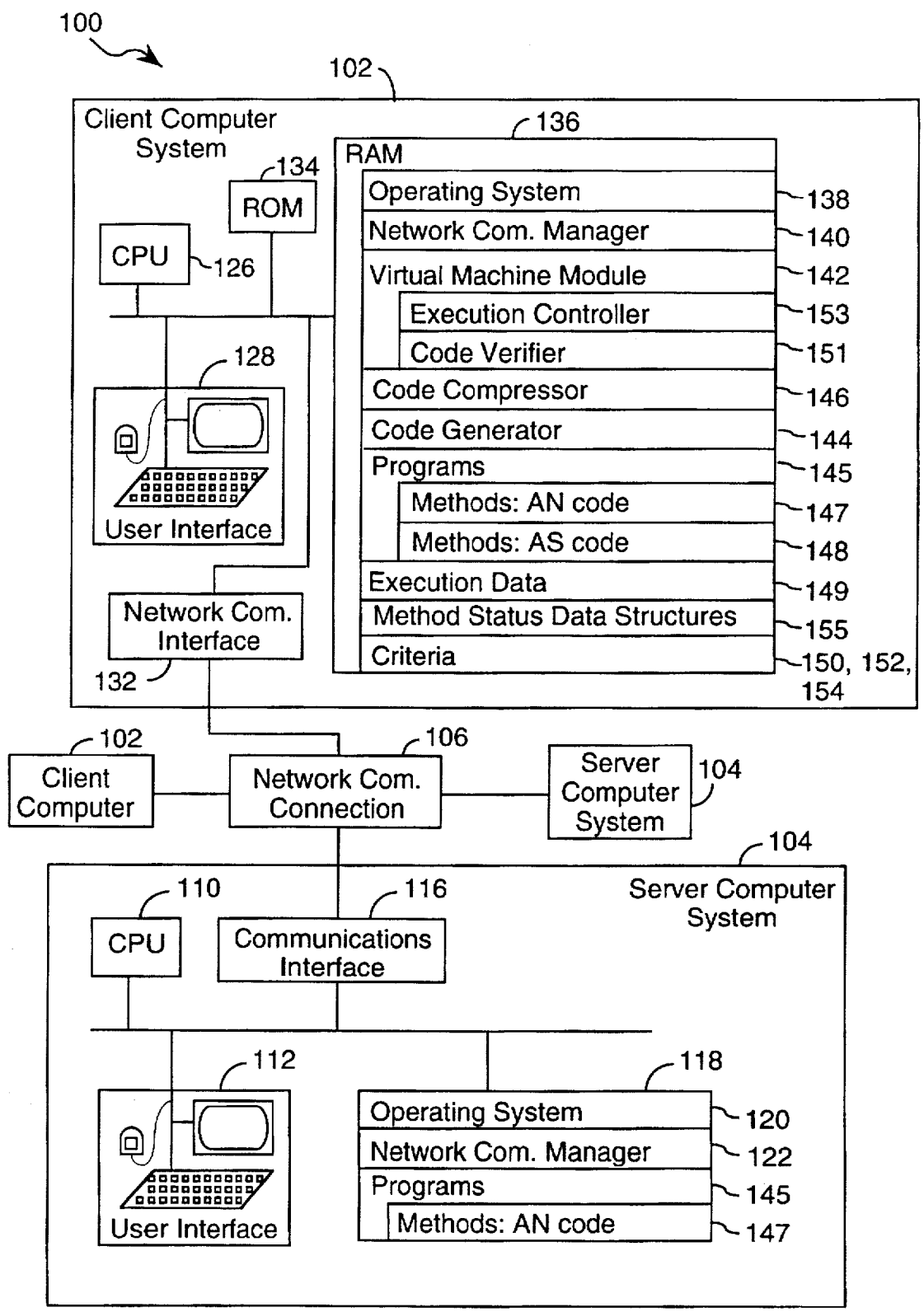
FIG. 1 is a block diagram of a client computer system incorporating the present invention.

Referring to FIG. 1, there is shown a computer network 100 in accordance with the present invention. It includes one or more client computer systems 102, one or more server computer systems 104, and a network communications connection 106.

The client computer systems 102 are connected to the server computer systems 104 via the network communications connection 106. The network communications connection may be a local or wide area network, the Internet, or some other type of network communications connection.

Each server computer system 104 includes a central processing unit (CPU) 110, a user interface 112, a network communications interface 116, and a memory 118. The network communications interface enables each server computer system to communicate with the client computer systems 102 via the network communications connection 106.

The memory 118 of each server computer system 104 stores an operating system 120, a network communications manager 122, and programs 145. The operating system and communications manager are all run on the CPU 110. The operating system controls and coordinates running of the network communications manager in response to commands issued by a user with the user interface 112 or received by the network communications interface 116 via the network communications connection 106 from users of the client computer systems 102.

The programs 145 comprise methods 147. For purposes of this document, any discrete fragment or portion of a program that is invoked and not invoked at various times during the execution of the program is considered a method.

The methods 147 of each server computer system 104 contain architecture neutral (AN) code in an AN language that is independent of the specific architecture (i.e., platform) of the client computer systems 102. These programs are compiled from a specific programming language into the AN code. In the preferred embodiment, these programs are written in the Java programming language and compiled into Java bytecode. Moreover, these programs are included in object classes with methods that form software programs which are programmed in an object-oriented manner.

As will be explained in more detail later, the methods 147 are transmitted upon user request to the client computer systems 102 using the network communications manager 122. Thus, the AN code of these methods is considered network mobile code.

Each client computer system 102 may be a video game, a personal digital assistant (PDA), a cellular phone, desktop computer, or other computer system or computer operated device which requires a small amount of run-time memory. Furthermore, each client computer system includes a central processing unit (CPU) 126, a user interface 128, a network communications interface 132, a read only memory (ROM) 134, and run-time (i.e., run-time) random access memory (RAM) 136. The network communications interface enables the client computer system to communicate with the server computer systems 104 via the network communications connection 106.

The RAM 136 of each client computer system 102 stores an operating system 138, a network communications manager 140, a virtual machine module 142, a code generator 144, and a code compressor 146 that have all been loaded from the ROM 134. The RAM also stores the programs 145 with methods 147 containing downloaded AN code and/or methods 148 containing architecture specific (AS) code that was generated from downloaded AN code. The operating system, network communications manager, virtual machine module, code generator, code compressor, and programs are all executed on the CPU 126. The operating system controls and coordinates execution of the network communications manager, virtual machine module, code generator, code compressor, and programs in response to commands issued by a user with the user interface 128.

As alluded to earlier, the methods 147 containing AN code are received from the server computer systems 104 upon user request. These methods are obtained using the network communications manager 140 which is, in the preferred embodiment, a HotJava network communications manager. The network communications manager then loads these methods in the RAM 136.

The code verifier 151 of the virtual machine module 142 verifies that the AN code of the loaded methods 147 meets predefined integrity criteria. As mentioned earlier, this may include stack and data type usage restrictions to ensure that loaded methods cannot overflow or underflow the virtual machine module's stack and that all instructions utilize only data whose data type matches the data type restrictions for those instructions. In the preferred embodiment, the virtual machine module is a Java virtual machine module.

The methods 148 containing AS code originally contained AN code that was obtained from the server computer systems 104 and loaded in the RAM 136 using the network communications manager 140. But, the original AN code of these programs has been generated into the AS code by the code generator 144. The AS code is executable on the specific architecture of the client computer. As mentioned earlier, a user may wish to have programs in AN code generated into AS code since the generated AS code may be executed faster than the corresponding AN code.

Furthermore, the methods 148 containing AS code have had their AN code generated when predefined AS code generation criteria 150 stored in the RAM 136 are satisfied. The As code generation criteria is inputted by the user with the user interface 128 and is more fully described later.

The execution controller 153 of the virtual machine module 142 controls execution of the methods 147 and/or 148. In particular, the executer interprets the AN code of the methods 147 for execution on the specific architecture of the client computer system 102 and enables these methods to call the methods 148 containing AS code for execution on the specific architecture. The execution 149 data generated during the execution of the methods is stored in the RAM 136. In addition, if the network communications manager 140, code generator 144, and/or code compressor 146 are in AN code, then the execution controller controls execution of them as well.

Furthermore, in order to keep the RAM space requirements of the client computer system 102 low, the code compressor 146 compresses and decompresses in the RAM 136 the code of the methods 147 and/or 148 at various times. This is done for the methods that are compressible and decompressible because they respectively satisfy predefined compression and decompression criteria 152 and 154 that are stored in the RAM 136 and inputted by the user with the user interface 128. The compression and decompression criteria are more fully described later.

The storage and invocation status of the methods 147 and/or 148 is maintained with the method status data structures 155. The method status data structures are updated by the network communications manager 140, the execution controller 153, the code generator 144, and the code compressor 146.

Figure 2:
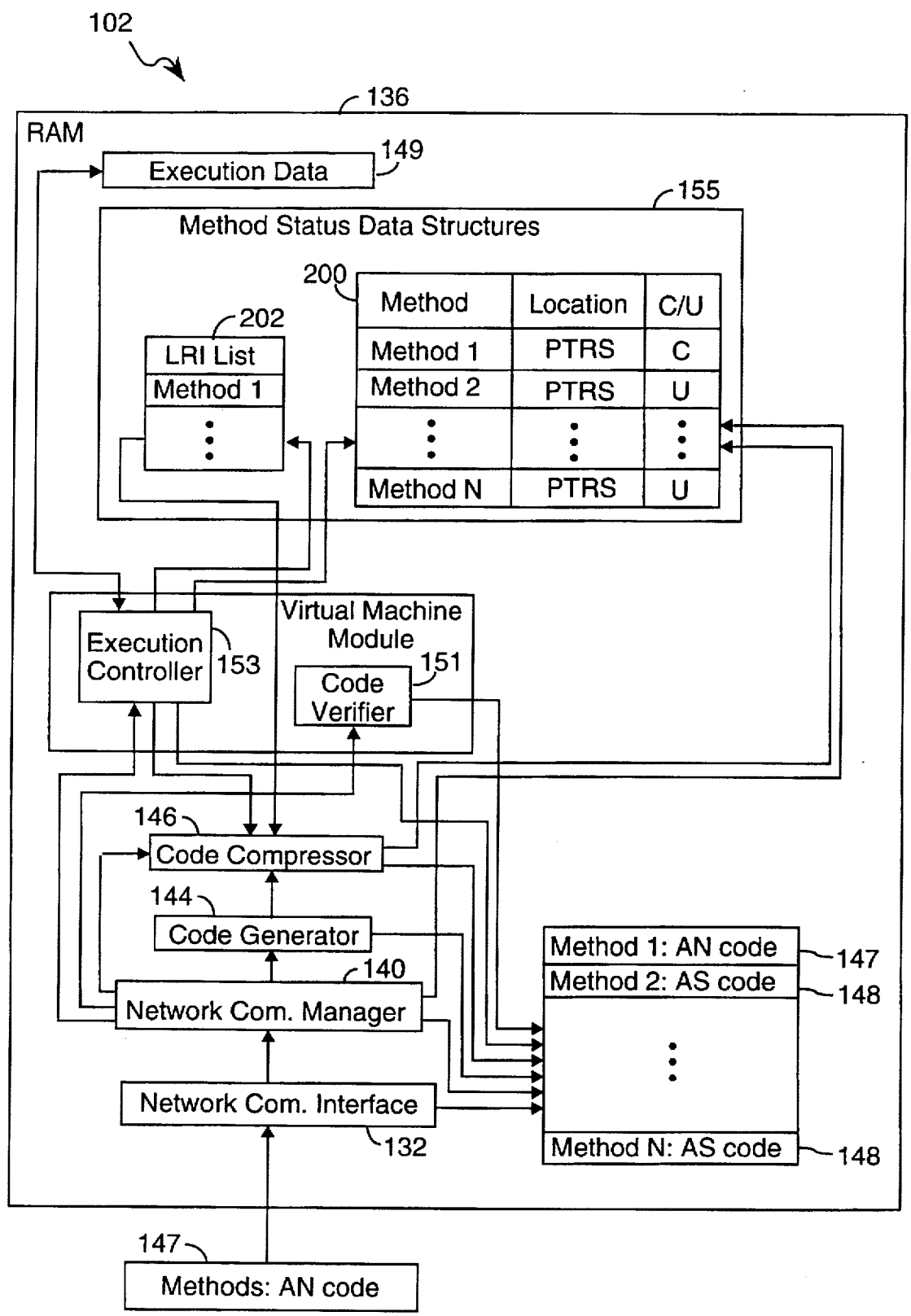
FIG. 2 is a functional block diagram of the operation of the client computer system.

FIG. 2 shows a functional block diagram of the operation of each of the client computer systems 102 in compressing and decompressing in the RAM 136 the methods 147 and/or 148. In addition, FIGS. 3 and 4 respectively show the preferred compression and decompression methods 300 and 400.

Figure 3:
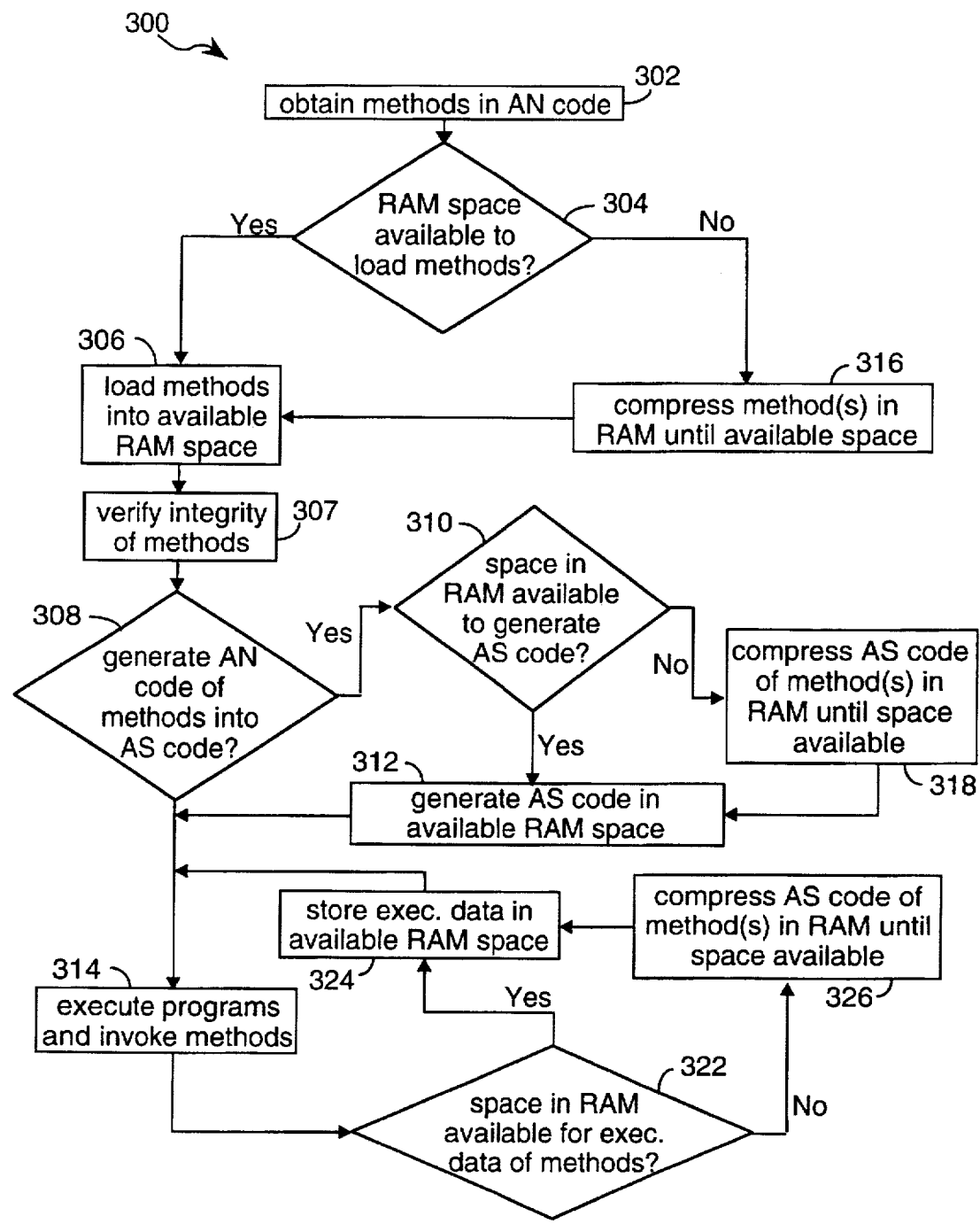
FIG. 3 is a flow chart of the compression method of the client computer system.

Referring to FIGS. 1–3, when a user requests execution of one of the programs 145 of one of the client computer systems 104, the user's client computer system 102 obtains each method 147 of the requested programs from the server computer system (step 302 of FIG. 3). This is done when the user issues a command with the user interface 128 to download and execute the program from the server computer system. In response, the operating system 120 calls the network communications manager 140 which generates a message indicating that such a request has been made. The network communications interface 132 then transmits the message to the server computer system.

The network communications interface 116 of the server computer system 104 receives the transmitted message. In response, the network communications manager 122 of the server computer system provides the methods 147 of the requested program 145 to the network communications interface which then transmits the methods to the user's client computer system 102.

The methods 147 that were transmitted are received by the network communications interface 132 of the user's client computer system 102. In response, the network communications manager 140 then determines if enough space in the RAM 136 is available for loading the received methods (decision step 304 of FIG. 3). If there is, then the network communications manager loads the AN code of these methods uncompressed into the available space in the RAM (step 306 of FIG. 3). As a result, these methods are loaded in the RAM along with previously loaded methods 147 of other programs 145. In loading these methods, the network communications manager updates the method storage status table 200 of the method status data structures 155 to identify the methods and the corresponding pointers to the memory spaces in the RAM 136 occupied by these methods. Furthermore, the network communications manager updates the method status table to indicate that the AN code of the methods is uncompressed (U).

The network communications manager 140 than invokes the code verifier 151 of the virtual machine module 142. In response, the code verifier verifies that the AN code of the methods 147 that were just loaded meets the predefined integrity criteria discussed earlier (step 307 of FIG. 3).

The network communications manager 140 the determines if the AN code of any of the methods 147 that were just loaded is to be compiled into AS code (decision step 308 of FIG. 3). This is done based on the AS code generation criteria 150. As those skilled in the art will recognize, the user may select and/or tune the AS code generation criteria from a broad range of options and based on a number of conditions specific to the user's client computer system. For example, the AS code generation criteria may specify that the AN code of all downloaded methods is to be generated into AS code when these methods are loaded, or that none of the downloaded methods with AN code are to have their AN code generated into AS code when they are loaded, or that only those downloaded methods with AN code of a specific size or type are to have their AN code generated into AS code when they are loaded.

If any of the methods 147 that were just loaded are to have their AN code generated into AS code, then the network communications manager invokes the code generator 144. The code generator determines if there is enough space in the RAM 136 to generate the AN code of these methods into AS code (decision step 310 of FIG. 3). If there is, then the code generator generates the AS code of these methods in the available space (step 312 of FIG. 3) and updates the pointers in the method storage status table 200 to point to the spaces occupied by the generated AS code. As a result, these methods, along with other previously downloaded methods whose AN code has been generated into AS code, are stored in the RAM as the methods 148 that contain AS code.

The program 145 with the methods 147 containing AN code that were just loaded and/or the methods 148 containing AS code that were just loaded and generated into AS code is then executed under the control of the executer (step 314 of FIG. 3) along with any previously loaded programs 145. As mentioned earlier, the execution controller interprets the AN code of the methods 147 for execution on the specific architecture of the user's client computer system 102 and enables these programs to call the methods 148 containing AS code for execution on the specific architecture.

Each of the loaded methods 147 and/or 148 may not be invoked at various times because it may have been put to sleep, etc . . . When the program execution controller determines that this has occurred, it adds the methods to the least recently invoked (LRI) list 202 of the method status data structures 155 to indicate that it is currently not invoked. The methods in the LRI list are listed from most recently invoked to least recently invoked.

As indicated earlier, in order to reduce the space requirements of the RAM 136, the code of each loaded method 147 and/or 148 for which the predefined compression criteria 152 is satisfied is compressed by the code compressor 146. In the preferred embodiment, the compression criteria specifies that the code of a compressible method 147 or 148 be compressed at the time when (1) space in the RAM 136 is needed but not available, and (2) the method is the least recently invoked of the methods in the LRI list 202 that has not yet had its code compressed.

When the network communications manager 140 determines that space in the RAM 136 is not available to load one or more of the methods 147 received by the server computer systems 104 (decision step 304 of FIG. 3), then it invokes the code compressor 146. In response, the code compressor compresses the code of the least recently invoked method(s) in the LRI list 202 until enough space has been made available (step 316 of FIG. 3). The code compressor also updates the method storage status table 200 to identify the corresponding pointer(s) to the memory space(s) of the compressed code of the method(s) and to indicate that the code of the method(s) has been compressed (C). The network communications manager then loads the method(s) for which space has been made available into the available space, as described earlier (step 306 of FIG. 3).

The code compressor 146 may use any fast data compression technique well known to those skilled in the art. Moreover, the code compressor may use separate compression techniques for optimal compression of the AN code of the methods 147 and the AS code of the methods 148.

In addition, when space in the RAM is required by the code generator for compiling one or more of the methods 147 just loaded (decision step 310 of FIG. 3), then the code generator 144 invokes the code compressor 146. As in the case of just loaded methods, the code compressor compresses the code of the least recently executed methods in the LRI list 202 until enough space has been made available (step 318 of FIG. 3) and, in doing so, updates the method storage status table 200 to identify the corresponding pointer (s) to the memory space(s) of the compressed code of the method(s) and to indicate that the code of the method(s) has been compressed (C). The code generator then generates in the available space the AS code of the methods for which the space has been made available, as described earlier (step 312 of FIG. 3).

Moreover, while the loaded methods 147 and/or 148 are invoked, they generate execution data. For any of these methods which the execution controller 153 determines is invoked (decision step 322 of FIG. 3) and for which space in the RAM 136 is available to store execution data (decision step 322), the execution controller stores the execution data in the RAM (step 324 of FIG. 3).

However, for each of the loaded methods 147 and/or 148 which the executer 153 determines is executable (decision step 320 of FIG. 3) and for which space in the RAM is not available but needed to store execution data (decision step 322), the executer invokes the code compressor 146. As in the earlier situations where space in the RAM is needed, the code compressor compresses the code of the least recently executed methods in the LRI list 202 until enough space has been made available (step 326 of FIG. 3). And, as described earlier, the code compressor updates the method storage status table 200 to identify the corresponding pointer(s) to the memory space(s) of the compressed code of the method (s) and to indicate that the code of the method(s) has been compressed (C). The execution controller then stores the execution data in the space made available in the RAM (step 324 of FIG. 3), as described earlier, and execution of the program with the method(s) whose execution data was stored continues (step 314 of FIG. 3).

Figure 4:
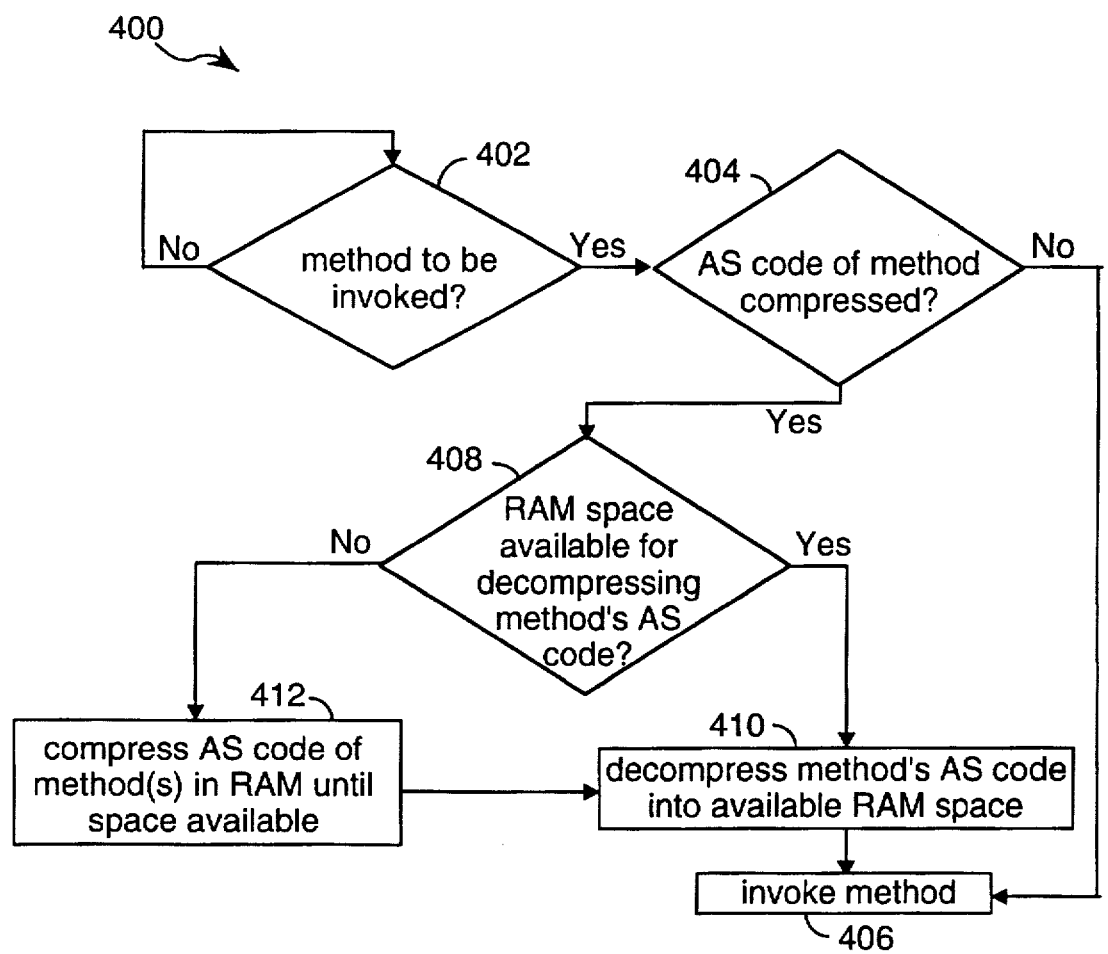
FIG. 4 is a flow chart of the decompression method of the client computer system.

Moreover, referring to FIGS. 1, 2, and 4, when space in the RAM 136 is available, each loaded method 147 and/or 148 that is compressed and for which the predefined decompression criteria 154 is satisfied is decompressed by the code compressor 146. In the preferred embodiment, the predefined decompression criteria for decompressing a decompressible method's code simply specifies that the code of the method is compressed and is to be decompressed at the time when the method is to be invoked again.

Thus, whenever the execution controller 153 determines that one of the loaded methods 147 and/or 148 is to be invoked (decision step 402 of FIG. 4), it determines whether the code of this method is compressed (decision step 404 of FIG. 4). This is determined from the method storage status table 200. If the method's code isn't compressed, then the method is invoked by the execution controller (step 406 of FIG. 4). When it is no longer invoked, its code may be compressed by the code compressor 146 in the manner described earlier.

However, if the code of the method 147 or 148 that is to be invoked is compressed, then the execution controller invokes the code compressor 146 to decompress the code of the method. The code compressor determines if there is enough space available in the RAM 136 to decompress the code of the method (decision step 408 of FIG. 4). If there is enough space available, the code compressor decompresses the code of the method in the available space (step 410 of FIG. 4). In doing so, it updates the method storage status table 200 to identify the corresponding pointer(s) to the memory space(s) of the uncompressed code and to indicate that the method's code is now uncompressed (U).

However, if there is not enough space available, then the code compressor 146 compresses the code of the least recently executed method(s) in the LRI list 202 whose code has not yet been compressed until space has been made available (step 412 of FIG. 4). This is done in the manner described earlier. After the space has been made available, the code of the method 147 or 148 that is to be decompressed is decompressed by the code compressor in the available space and then invoked by the execution controller 153, in the manner just described (steps 410 and 406 of FIG. 4).

In view of the foregoing, it is clear that the present invention provides a reduction in run-time memory space while saving execution speed. This is due to the fact that by compressing the loaded methods 147 and/or 148, they do not need not be flushed from the RAM 136 and re-downloaded from the server computer systems 104 when space in the RAM is needed. Moreover, in the case of the methods containing AS code, execution speed is further saved since these methods need not be re-downloaded and re-generated. However, as those skilled in the art will recognize, other alternative embodiments could be implemented to provide similar benefits.

Specifically, the compression criteria 152 described earlier specified that the code of least recently invoked method(s) 147 and/or 148 with uncompressed code would be compressed when space in the RAM 136 was needed but not available. However, the compression criteria may be selected by the user from a broad range of options and based on a number of conditions specific to the user's client computer system 102. For example, the compression criteria may simply specify that the code of each method is to be compressed as soon as the program is no longer invoked. Or, it may specify that the code of certain methods is to be compressed lazily whenever time is available for doing so. As an additional variation of any of the foregoing, the compression criteria may specify that only the code of methods of a specific size or type is to be compressed.

Moreover, as was stated earlier, the decompression criteria 154 specified that a method 147 or 148 whose code is compressed code would have its code decompressed as soon as the method was to be invoked. However, the decompression criteria could specify that the compressed code be decompressed after a predetermined time interval has expired. In this case, the data compressor would include a timer to time the time interval. In one example, this technique could be used for a method that is being put to sleep for a known time interval so that the method will be compressed for this time interval and then decompressed just prior to when it is to be awakened. Or, in another example, the technique could be used for a method that is waiting for data where the time interval over which the method is compressed would be selected so as to predict when the data will become available for the method.

In another embodiment, the compression criteria 152 may also include flushing criteria specifying when the loaded methods 147 and/or 148 are to be flushed from the RAM 136. For example, the flushing criteria may indicate that if there are no more loaded methods in the RAM that are not invoked, then the least recently invoked method(s) in the LRI list 202 with compressed code are flushable and are to be flushed from the RAM 136 until enough space is made available. As a result, when a method is flushed from the RAM and then is to be invoked again, the network communications manager must re-download the method from the server computer system 104 that supplied the method in the manner discussed earlier. The execution controller 153 updates the method storage status table 200 by removing reference to any flushed methods.

Moreover, as variation to the embodiment just described, the AS code generation criteria 150 may specify that the AN code of methods 148 that have had their AN code generated into AS code should be retained in the RAM 136 along with the generated AS code. This would be done so that the AN code of the method can be re-generated into the AS code of the method in case the AS code of the method has to be flushed from the RAM. This will save the time required to re-download the AN code of the method from the server computer system. In addition, the AN code could be compressed in the RAM until it is needed for re-generation into the AS code.

In another variation of the embodiment just described, the downloaded AN code of methods 148 would initially be executed under the control of the execution controller 153. Then, the execution controller would gather statistics based on the run-time behavior of the AN code and generate the AN code into AS code if the gathered statistics satisfy certain threshold criteria in the AS code generation criteria 150. For example, the execution controller may maintain a count of the number of times the AN code is run. Once this count has passed a threshold number, the execution controller would invoke the code generator 144 to generate the AN code into AS code.

Figure 5:
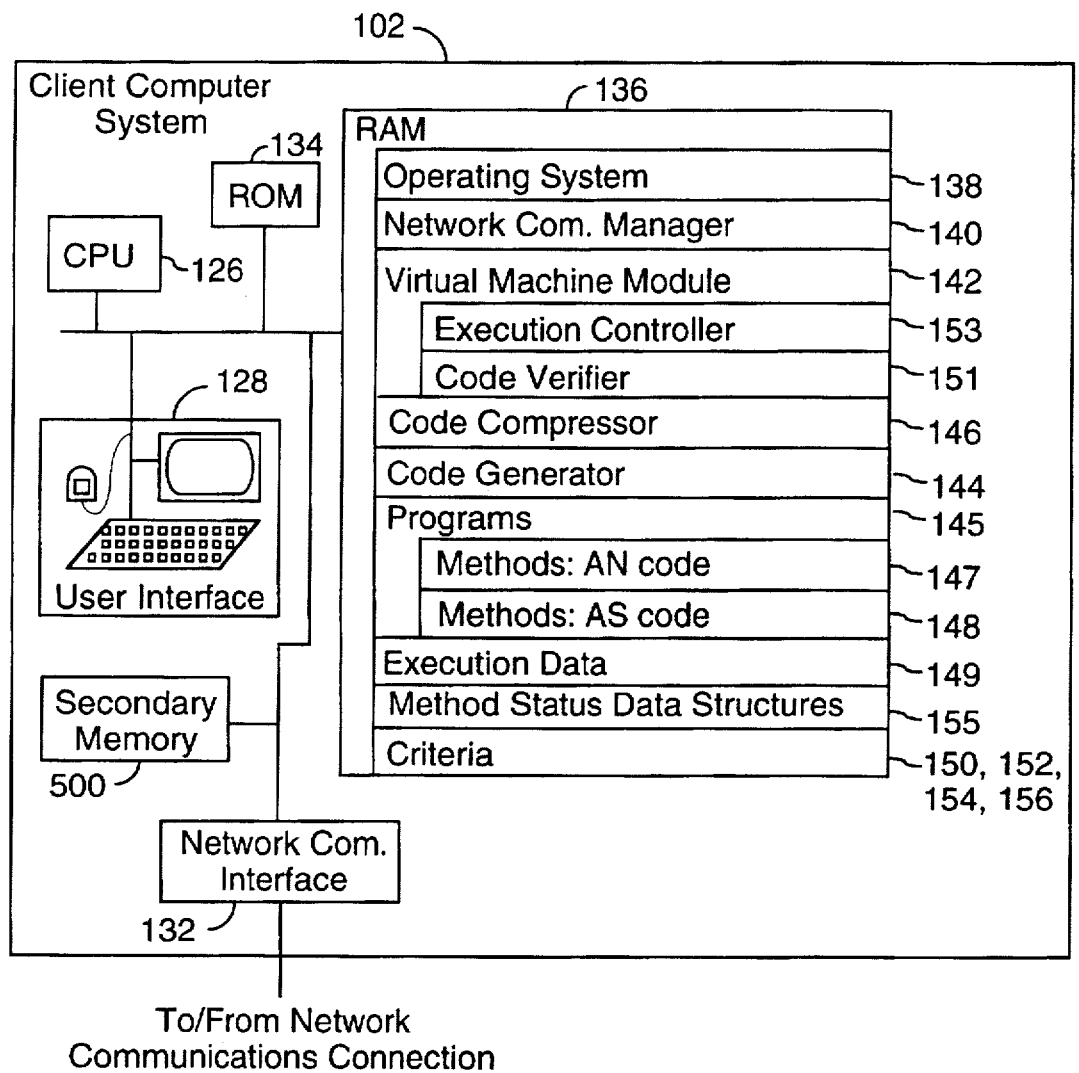
FIG. 5 shows an alternative embodiment of the client computer system.
Figure 6:
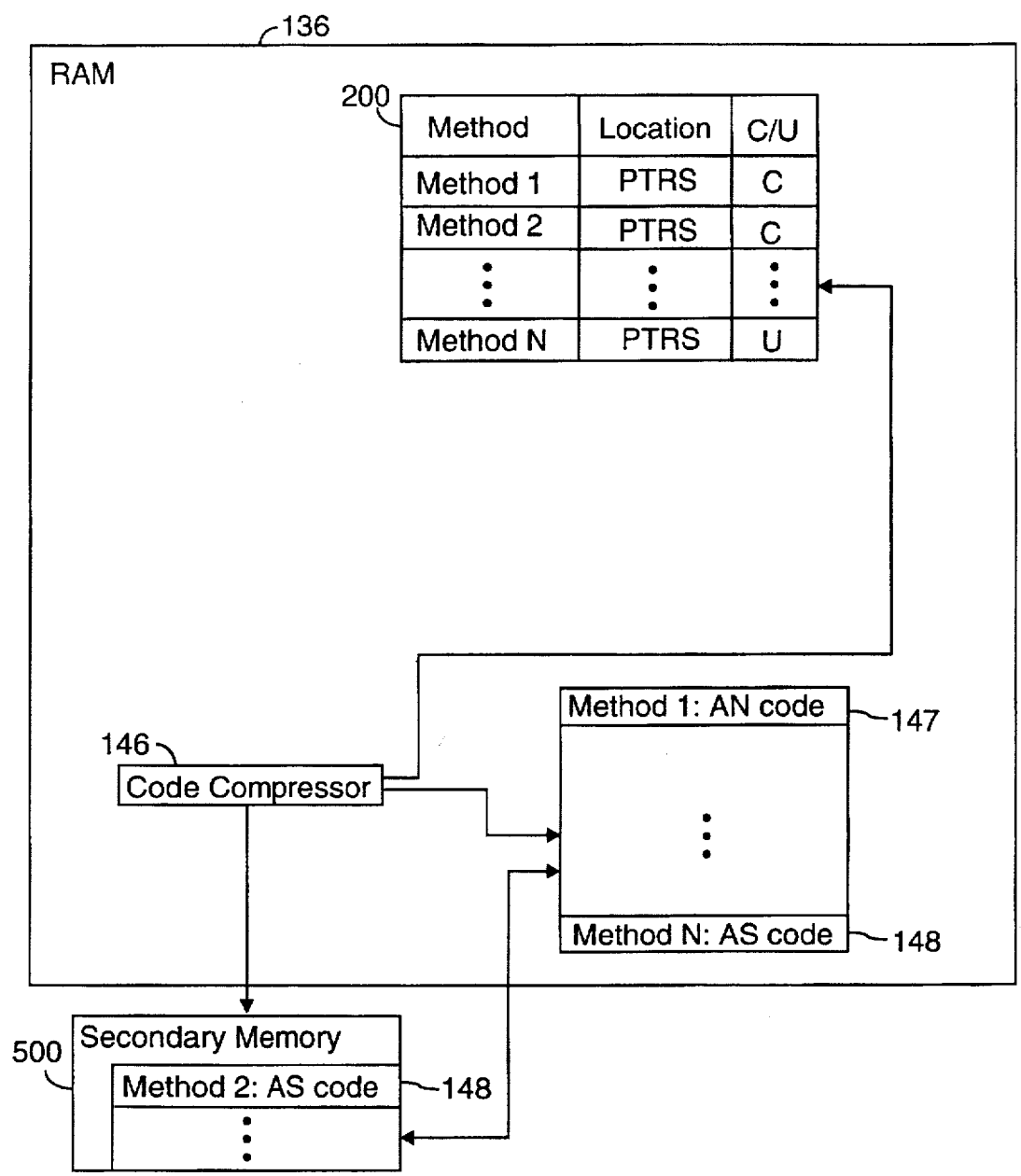
FIG. 6 shows a functional block diagram of the operation of the alternative embodiment of the client computer system.

Since flushing loaded methods 147 and/or 148 from the RAM 136 is costly in terms of execution speed, a secondary memory 500 could be used to store the methods that would otherwise be flushed, as shown in FIGS. 5 and 6. In this case, the compression criteria 152 discussed earlier would include secondary storage criteria 156 that would be similar to the flushing criteria just discussed and used to store methods that are storable because they satisfy the secondary storage criteria. However, in this case, the code compressor 146 would update the pointers in the method storage status table 200 to point to these methods in the secondary memory. Furthermore, for the methods that are retrievable in that their code is compressed, stored in the secondary memory, and is to be decompressed, the code of the methods would be retrieved from the secondary memory and then decompressed in the RAM 136 in the manner described earlier.

Moreover, in an embodiment where the client computer system 102 includes a secondary memory 500 (e.g., a networked desktop computer), the methods 147 could be downloaded from the server computer systems 104 to the secondary memory. Then, these methods could be loaded directly into the RAM 136 from the secondary memory rather then from the server computer systems 104. Additionally, in such an embodiment, the operating system 138, the network communications manager 140, the virtual machine module 142, and the code compressor 146 could be stored in the secondary memory and loaded from there into the RAM.

In still another embodiment, the operating system 138, the network communications manager 140, the virtual machine module 142, the code generator 144, and the code compressor 146 could be downloaded from one of the server computer systems 104 into the RAM 136 of the client computer system 102. This would be done in a similar manner as that described earlier for the methods 147 of a server computer system.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer network over which is provided programs with methods in architecture neutral code, a client computer system for executing the programs with reduced run-time memory space requirements when the methods are in architecture specific code generated from the architecture neutral code of the methods, the client computer system comprising:

a run-time memory;

a network communications interface that receives the methods in architecture neutral code;

a network communications manager that loads, in uncompressed form, into available space in the run-time memory the architecture neutral code of the methods when received;

a code generator that generates in the run-time memory uncompressed architecture specific code of the methods from the loaded architecture neutral code of the methods;

an execution controller that controls execution of the programs, whereby the methods are invoked and not invoked at different times;

a code compressor to (A) compress in the run-time memory the uncompressed architecture specific code of compressible ones of the methods that are not invoked, whereby space is made available in the run-time memory, and (B) decompress into available space in the run-time memory the compressed architecture specific code of decompressible ones of the methods so that the decompressible ones of the methods may be invoked.

2. The client computer system of claim 1 wherein the code compressor decompresses the compressed architecture specific code of the decompressible ones of the methods as soon as the decompressible ones of the methods are to be invoked.

3. The client computer system of claim 1 wherein the code compressor decompresses the compressed architecture specific code of the decompressible ones of the methods after a predetermined time interval.

4. The client computer system of claim 1 wherein the code compressor compresses the uncompressed architecture specific code of the compressible ones of the methods as soon as the compressible ones of the methods are no longer invoked.

5. The client computer system of claim 1 wherein the code compressor compresses the uncompressed architecture specific code of the compressible ones of the methods when space in the run-time memory is needed but not available.

6. The client computer system of claim 5 further comprising:

a least recently invoked list that lists those of the methods that are currently not invoked in order of least recently invoked method to most recently invoked method;

the compressible ones of the methods are the least recently invoked methods in the least recently invoked list with uncompressed architecture specific code when space in the run-time memory is needed but not available.

7. The client computer system of claim 1 wherein the run-time memory is a random access memory.

8. The client computer system of claim 1 wherein the code compressor flushes from the run-time memory the compressed architecture specific code of flushable ones of the methods when space in the run-time memory is needed but not available.

9. The client computer system of claim 1 further comprising:

a secondary memory;

the code compressor (A) stores in the secondary memory the compressed architecture specific code of storable ones of the methods when space in the run-time memory is needed but not available, and (B) retrieves from the secondary memory the compressed architecture specific code of retrievable ones of the methods whose compressed architecture specific code is to be decompressed.

10. In a computer network over which is provided programs with methods in architecture neutral code, a method of executing the programs with reduced run-time memory space requirements when the methods are in architecture specific code generated from the architecture neutral code of the methods, the method comprising the steps of:

providing a run-time memory;

receiving the programs in architecture neutral code;

loading, in uncompressed form, into available space in the run-time memory the architecture neutral code of the methods when they are received;

generating in the run-time memory uncompressed architecture specific code of the methods from the loaded architecture neutral code of the methods;

executing the programs, whereby the methods are invoked and not invoked at different times;

compressing in the run-time memory the uncompressed architecture specific code of compressible ones of the methods that are not invoked, whereby space is made available in the run-time memory; and decompressing into available space in the run-time memory the compressed architecture specific code of decompressible ones of the methods so that the decompressible ones of the methods may be invoked.

11. The method of claim 10 wherein the decompressing step includes decompressing the compressed architecture specific code of the decompressible ones of the methods as soon as the decompressible ones of the methods are to be invoked.

12. The method of claim 10 wherein the decompressing step includes decompressing the compressed architecture specific code of the decompressible ones of the methods after a predetermined time interval.

13. The method of claim 10 wherein the compressing step includes compressing the uncompressed architecture specific code of the compressible ones of the methods as soon as the compressible ones of the methods are no longer invoked.

14. The method of claim 10 wherein the compressing step includes compressing the architecture specific code of the compressible ones of the methods when space in the run-time memory is needed but not available.

15. The method of claim 14 further comprising the steps of:
   providing a least recently executed list that lists those of the methods that are currently not invoked in order of least recently invoked method to most recently invoked method;
   the compressible ones of the methods are the least recently invoked methods in the least recently invoked list with uncompressed architecture specific code when space in the run-time memory is needed but not available.

16. The method of claim 10 wherein the run-time memory is a random access memory.

17. The method of claim 10 further comprising the step of flushing from the run-time memory the compressed architecture specific code of flushable ones of the programs when space in the run-time memory is needed but not available.

18. The method of claim 10 further comprising the steps of:
   providing a secondary memory;
   storing in the secondary memory the compressed architecture specific code of storable ones of the methods when space in the run-time memory is needed but not available; and
   retrieving from the secondary memory the compressed architecture code of retrievable ones of the methods whose compressed architecture specific code is to be decompressed.

19. A computer program product for use with a client computer system in a computer network over which is provided programs with methods in architecture neutral code, the client computer system including a network communications interface to receive the methods in architecture neutral code and a run-time memory to execute the programs with the methods in architecture specific code generated from the architecture neutral code of the methods, the computer program product comprising a computer readable storage medium and a computer program mechanism embedded therein, the computer program mechanism comprising:
   a network communications manager that loads, in uncompressed form, into available space in the run-time memory the architecture neutral code of the methods when received;
   a code generator that generates in the run-time memory uncompressed architecture specific code of the methods from the loaded architecture neutral code of the methods;
   an execution controller that controls execution of the programs, whereby the methods are invoked and not invoked at different times;
   a code compressor to (A) compress in the run-time memory the uncompressed architecture specific code of compressible ones of the methods that are not invoked, whereby space is made available in the run-time memory, and (B) decompress in available space in the run-time memory the compressed architecture specific code of decompressible ones of the methods so that the decompressible ones of the methods may be invoked.

20. The computer program product of claim 19 wherein the code compressor decompresses the compressed architecture specific code of the decompressible ones of the methods as soon as the decompressible ones of the methods are to be invoked.

21. The computer program product of claim 19 wherein the code compressor decompresses the compressed architecture specific code of the decompressible ones of the methods after a predetermined time interval.

22. The computer program product of claim 19 wherein the code compressor compresses the uncompressed architecture specific code of the compressible ones of the methods as soon as the compressible ones of the methods are no longer invoked.

23. The computer program product of claim 19 wherein the code compressor compresses the uncompressed architecture specific code of the compressible ones of the methods when space in the run-time memory is needed but not available.

24. The computer program product of claim 23 further comprising:
   a least recently executed list that lists those of the methods that are currently not invoked in order of least recently invoked method to most recently invoked method;
   the compressible ones of the methods are the least recently invoked methods in the least recently invoked list with uncompressed architecture specific code when space in the run-time memory is needed but not available.

25. The computer program product of claim 19 wherein the run-time memory is a random access memory.

26. The computer program product of claim 19 wherein the code compressor flushes from the run-time memory the compressed architecture specific code of flushable ones of the methods when space in the run-time memory is needed but not available.

27. The computer program product of claim 19 wherein:
   the client computer system further includes a secondary memory;
   the code compressor (A) stores in the secondary memory the compressed architecture specific code of storable ones of the methods when space in the run-time memory is needed but not available, and (B) retrieves from the secondary memory the compressed architecture specific code of retrievable ones of the methods whose compressed architecture specific code is to be decompressed.

* * * * *